(12) United States Patent
Crawford et al.

(10) Patent No.: US 8,156,203 B2
(45) Date of Patent: Apr. 10, 2012

(54) DYE INJECTED REQUEST GENERATION

(75) Inventors: Brian Crawford, Seattle, WA (US); David Gray, Seattle, WA (US); John Cunningham, Kirkland, WA (US); Peter Huene, Seattle, WA (US); Steve Carroll, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 137 days.

(21) Appl. No.: 12/210,875

(22) Filed: Sep. 15, 2008

(65) Prior Publication Data

US 2010/0070611 A1    Mar. 18, 2010

(51) Int. Cl.
    *G06F 15/16* (2006.01)
(52) U.S. Cl. ......... 709/219; 709/203; 709/217; 702/182
(58) Field of Classification Search .......... 709/202–203, 709/217–219; 702/182–184
    See application file for complete search history.

(56) References Cited

U.S. PATENT DOCUMENTS

| | | | |
|---|---|---|---|
| 6,336,135 B1 | 1/2002 | Niblett | |
| 6,401,125 B1 | 6/2002 | Makarios | |
| 6,976,077 B1 | 12/2005 | Lehew | |
| 7,260,837 B2 | 8/2007 | Abraham | |
| 7,925,734 B2 * | 4/2011 | Leduc | 709/217 |
| 2005/0010574 A1 | 1/2005 | Vaught | |
| 2005/0273490 A1 * | 12/2005 | Shrivastava et al. | 709/203 |
| 2007/0043837 A1 | 2/2007 | Kruse | |
| 2009/0019312 A1 * | 1/2009 | Kulkarni et al. | 714/32 |

FOREIGN PATENT DOCUMENTS

| | | |
|---|---|---|
| EP | 0969430 A1 | 1/2000 |
| WO | 9740457 A1 | 10/1997 |
| WO | 2008061042 A2 | 5/2008 |

OTHER PUBLICATIONS

"Capturing and Analyzing Client Transaction Metrics for .NET-Based Web Services"; .msdn.microsoft.com/en-us/magazine/cc163950.aspx.

"Dynamic Application-Layer Protocol Analysis for Network Intrusion Detection"; usenix.org/event/sec06/tech/full_papers/dreger/dreger.pdf.

* cited by examiner

*Primary Examiner* — Bharat Barot
(74) *Attorney, Agent, or Firm* — Microsoft Corporation

(57) ABSTRACT

Web server processes can host multiple web applications that process multiple requests from multiple clients. Recorded diagnostic information may not provide a useful separation of server execution data (e.g., functionality executed to process a request) based on a client's use of the web server process. An effective method for separating server execution data by client information is provided herein. Dye is injected into a request from a client, the dye comprises information regarding the client application making the request and a transaction (e.g., client defined set of requests) that the request is comprised within. The dye injected request is sent to a web server process (e.g., on a web server) that extracts the dye and executes the request. During execution of the request, executed functionality is associated and stored with the extracted dye. The recorded server execution data may be organized based upon the request, client, application, and/or transaction.

20 Claims, 9 Drawing Sheets

DYE INJECTED REQUEST GENERATION

BACKGROUND

It can be appreciated that a web server process can host multiple web applications that execute requests from multiple clients. However, other than the instructions comprised within a particular request, the web server process is generally aware of very little other information associated with the request. For example, a web server process may be able to identify an IP address of a client making a particular request, but not the application and/or context from which the request was made. Diagnostic information (e.g., server execution data) of a particular client's use of a web server process is thus limited because of the multitude of web applications hosted on the particular client device and the multitude of requests issued to the web application (e.g., from the same or different clients running the same or different applications) as well as other factors. Accordingly, only moderately useful analysis may presently be performed to provide some type of correlation between server execution data and client information (e.g., based upon a client's IP address).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Within a computing environment, many times a client application accesses functionality and data from a source remote to the client application. For example, a client machine may host a client application that requests functionality to be executed on a server machine. The server machine may comprise a web server process, for example, that hosts web applications. The client application (e.g., a web browser) may send requests to the web server process to execute functionality of a web application (e.g., a webpage). For example, a user may invoke a web browser to display a webpage. The web browser sends an HTTP request to a web server process to execute functionality and return HTML display information of the webpage.

The web server may be configured to record server execution data (e.g., application execution data) during execution by the web server process of the requests. Server execution data may comprise data inputs used in executing a request and/or functionality executed in executing the request (e.g., a runtime call tree, application data). Because a request may not provide information regarding the client, however, the recorded server execution data may not provide enough information to separate records based upon the client machine the request originated from, the application that made the request, and/or any logical grouping or contextual information of the request (e.g., a transaction). Thus, the recorded server execution data can not be fully harvested because it is not correlated to client information.

As provided herein, a technique for separating server execution data based upon information regarding a request, an application originating the request, and/or a client transaction comprising the request is disclosed. For example, when a client application makes a request to a web server process, dye is injected into the request at the client machine. The dye comprises information regarding the client application from which the request originated and/or information regarding the transaction within which the request is comprised. A transaction is a client defined logical grouping of one or more requests, and may be arbitrarily chosen by the client. For example, a user may initiate a test of a merchant webpage (e.g., a webpage allowing a user to purchase goods from the webpage). The user may define a transaction as the user interaction with the webpage through a web browser from beginning to end (e.g., product selection and purchase via mouse clicks, keystrokes, etc.). The transaction comprises the corresponding functionality processed by a web server process handling the user interaction (e.g., functionality of an event handler). For example, the user may define a transaction as 3 requests: a selection of a product on the merchant webpage, an input of credit card information for the purchase, and a confirmation of the purchase.

Once the dye regarding the client application and transaction is injected into the request, the dye injected request is sent to the web server process designated by the request. The web server process receives the dye injected request and extracts the dye from the request. Information regarding the request and the dye may be stored in memory. The information may be stored for a request lifetime (e.g., a duration of time corresponding to the execution/fulfillment of the request). The web server process executes the request by invoking functionality used to process the request. During the execution of the request, one or more operations performed during executing the request are associated with the stored information regarding the request and the dye. An operation may comprise, for example, information regarding functionality executed by the web server process and/or data inputs used by the web server process. A record, representing server execution data for the request, may be made that comprises the request, the dye information, and/or other operation information.

Server execution data (e.g., one or more recordings) may be analyzed based upon the additional client information comprised within the dye. Server execution data may, for example, be parsed according to particular requests, the client applications that made the requests, and/or the transactions comprising the requests. A user is thus able to organize and view server execution data pertaining to some logical activity, instead of just a huge heap of all the server execution data performed by the web server process. The organization by client information is useful because the web server process may handle multiple web applications, multiple requests, and multiple client machines making requests, which would otherwise be undistinguishable based upon client information. Another benefit is the ability to facilitate a secure testing environment. The diagnostic information may be filtered to server execution data pertaining to a specified tester.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
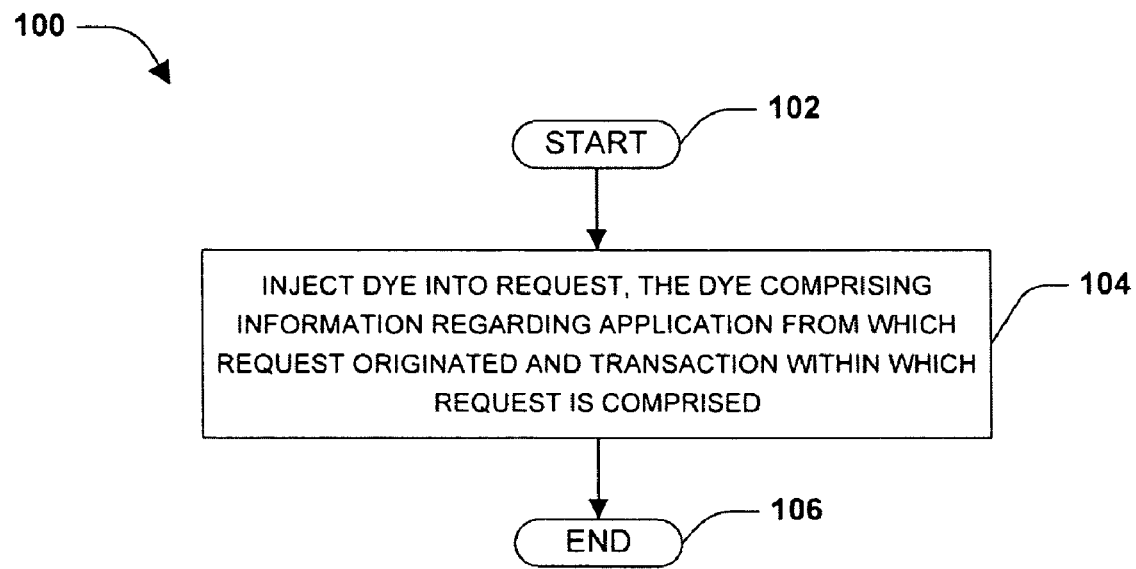
FIG. 1 is a flow chart illustrating an exemplary method of creating a dye injected request.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A client machine may host a client application configured to interact with web applications. The client application may make requests to a web application to execute functionality (e.g., HTTP request for execution of a web service, HTTP request for execution of an event handler for a webpage, etc.). A web server process may host multiple web applications on a web server machine. The web server process handles the requests from client applications by executing functionality of a web application requested by the client applications. One example is a client/server environment.

It may be appreciated that the client application may make requests to a web application, a database, a web service, and/or any other functionality that may be invoked through a generic protocol.

It may be advantageous to provide a user of a client machine making requests to a web server process with diagnostic information regarding the user's activity with the web server process (e.g., one or more requests made by the user, server execution data, etc.). Creating a useful analysis of server execution data becomes an issue because the requests from a client machine may not comprise detailed information regarding the client. Therefore, the web server process does not know the client application that originated the request and/or the context in which the request was made (e.g., is the request part of a series of logically related requests, such as, the completion of a test or task). Furthermore, the web server process may handle multiple requests from multiple client machines such that the server execution data from different client requests becomes indistinguishable. For example, a user would be unable to separate server execution data based upon which client application made a particular request.

For example, two users on different client machines may use a similar version of a client application (e.g., web browser) to access functionality from a web server process hosting a web application (e.g., a web service). While the web server process handles the requests for both users, server execution data may be recorded. A particular user may not be able to separate the server execution data that pertains to the particular user because the server execution data does not provide enough information about the client machines that made the requests. The server execution data may provide the IP address of the client machine, but no information regarding the client application that made the request.

A web application development environment is one example where separation of server execution data may be advantageous. A web application may be hosted by a single web server process. The web server process may handle requests from multiple developers on separate client machines. A developer may conduct a test (e.g., a transaction) that involves multiple requests using more than one client application to make the requests. It may be advantageous for a developer to be able to analyze the server execution data pertaining to the developer and filter out server execution data pertaining to other developers.

As provided herein, server execution data can be separated by a request, a client application making the request, and/or a transaction comprising the request. When a client application makes a request to a web application on a web server, additional information regarding the client is injected at the client machine into the request. The additional information may comprise information regarding the client application making the request and/or information regarding the context in which the request is made. For example, one way to define additional contextual information is where a client defines a transaction. The transaction may provide contextual information about one or more requests associated with the transaction. A transaction may be a client defined logical grouping of one or more requests, and may be arbitrarily chosen by the client. A logical grouping may be a set of requests made to accomplish a task or test (e.g., a set of requests made to a web commerce webpage in order to select an item and complete a credit card transaction for the purchase of the selected item). Another example of contextual information may be a current user associated with a request, a call stack of a thread making the request, client machine properties, an operating system of the client machine, and/or information describing one or more applications installed on the client machine. It may be appreciated that contextual information may comprise other information than listed. Once the information is injected into the request, the injected request may be sent to the web server.

At the web server, the additional client information is extracted from the injected request. The extracted information may be stored in memory while the request is executed. A web server process executes the request by invoking functionality and/or handling data inputs of a web application corresponding to the request. During execution of the request, information regarding the execution of the request is associated with the client information. A record may be created comprising the request; the additional information regarding the client (e.g., the application that made the request and/or the context information of the request); and the server execution data (e.g., functionality and/or input data used in processing the request). The record may be stored in memory for later analysis.

An analysis may be performed on one or more records. The analysis may allow the data (e.g., server execution data) comprised within the records to be separated by client information. For example, an analysis may provide record data corresponding to a specific client application that made requests to a web server. Another analysis may provide record data associated with a specified logical grouping (e.g., a transaction). The analysis may further provide record data associated with a specified request.

One embodiment of creating a dye injected request is illustrated by an exemplary method 100 in FIG. 1. At 102, the method beings. At 104, dye is inject into a request, the dye comprising information regarding an application from which the request originated and information regarding a transaction within which the request is comprised. At 106, the method ends.

At the client machine, a dye injected request is created by injecting dye into a request made by an application (e.g., a client application). The dye injected request may be sent a web server process handling a web application the original request was intended to reach. Injecting dye into the request provides a web server process with additional information regarding the application and the transaction that the web server process may not otherwise have.

It may be appreciated that injecting dye comprising the application and injecting dye comprising the transaction may be actions independent of one another. The dye injection is performed at the client machine because the target web application or web service may be stateless and run on separate computers. The web server process may not have the ability to track the application that made the request. Application information is injected into the request at the client because the request may not expose this information to the web server process.

Transaction information is injected at the client because the transaction is a concept defined by the client. A transaction may comprise multiple applications and/or multiple requests that the client logically groups together. Because the web application is stateless, the web server process has limited ability to provide contextual meaning to the request (e.g., the web server process may not be able to provide a logical grouping or relationship between requests and/or client information). The injected dye may be injected into one or more requests that are a part of a transaction.

One example of injecting dye into a request is the use of an HTTP header. An HTTP proxy may be used to connect to a web request framework. The web request framework makes and sends requests to destinations such as a web server. Using the HTTP proxy, an HTTP header may be attached to the request. The HTTP header may comprise information regarding the application which made the request and/or information describing the transaction that the request is a part of. The HTTP header may be attached to one or more requests to uniquely identify the client. In particular, an HTTP header may be duplicated and injected into one or more requests that are a part of the same transaction.

Figure 2:
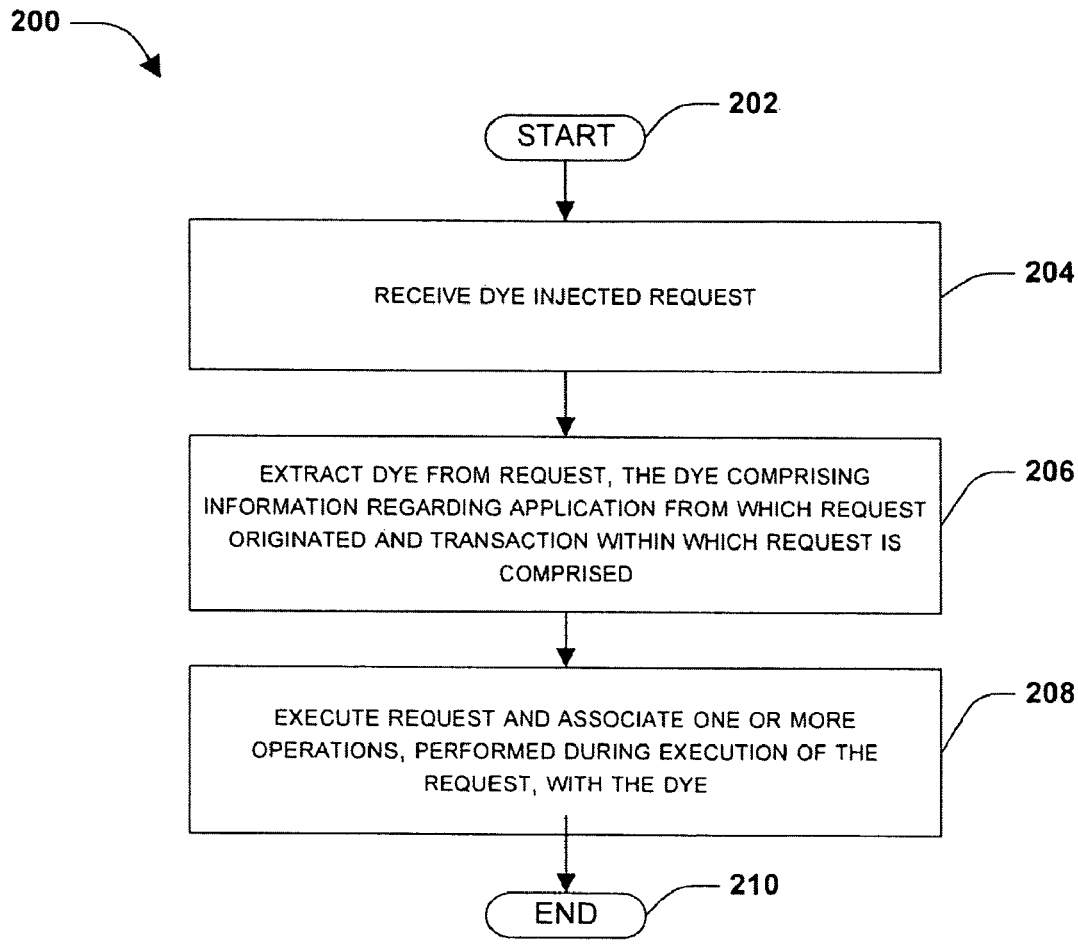
FIG. 2 is a flow chart illustrating an exemplary method of tracking one or more dye injected requests.

One embodiment of tracking one or more dye injected requests is illustrated by an exemplary method 200 in FIG. 2. At 202, the method begins. At 204, a dye injected request is received. The dye injected request may be received as HTTP, a stream of data, and/or any other data format. The dye injected request may be received at the web server by a web server process handling requests for a web application.

At 206, the dye is extracted from the request. The dye comprises information regarding an application from which the request originated and a transaction within which the request is comprised. The extracted dye may be stored in memory for the lifetime of the request. A request lifetime may be the duration of the time associated with the execution of the request, such from the initiation of processing associated with the request to the completion of processing associated with the request. A request lifetime may be coupled and stored with the dye in memory. For example, a request lifetime may be extracted from a web server processing pipeline. A begin request event and an end request event may be extracted from the pipeline and stored with dye in memory.

At 208, the request is executed. While the request is executed, one or more operations, performed during the execution of the request, are associated with the dye. An operation may comprise a set of data inputs used to execute the request, a set of functionality executed in order to execute the request, and/or a request lifetime. The operations may be associated with the dye by storing information regarding the operations in memory with the dye. At 210, the method ends.

The request information, the extracted dye information, the request lifetime, and operation information may be stored as a record. One or more records may be analyzed and presented to a user. Because of the additional information from the dye, the recorded information may be organized and separated based upon client information. The user may be able to specify criterion used to filter and sort the records in a meaningful way. For example, the user may filter by request, client making the request, application originating the request, and/or the transaction comprising the request.

For example, a user may use a web browser (e.g., a client application) and an image viewer (e.g., a second client application configured to request images from a web application) to test a photo search webpage (e.g., web application). The user may define a transaction as comprising three requests from the web browser to the photo search webpage and one request from the image viewer to the photo search webpage. The three requests from the web browser may encompass navigating the photo search webpage to an image available for download; requesting the image from the photo search webpage; and verifying a secure connection for downloading of the image. The request from the image viewer may encompass a request to the photo search webpage to initiate the download of the image.

The three requests from the web browser may be injected with dye comprising information regarding the web browser and the transaction. The one request from the image viewer may be inject with dye comprising information regarding the image viewer and the transaction. Once a request is injected with dye, the dye injected request is sent to a web server comprising the photo search webpage. Upon receiving one of the dye injected requests, the dye is extracted and stored in memory. During execution of the request, operations performed are associated with and stored with the dye in memory. A record is formed comprising the request information, the extracted dye information, a request lifetime, and one or more associated operations.

Server execution data (e.g., one or more records) pertaining to the transaction may be organized based upon the application, the transaction, and/or the request. A user may usefully analyze the information regardless of the fact that the transaction is defined at the client machine, the transaction comprises multiple applications; the web server process may handle other client's requests; and other client's requests may originate from the same application version as the user's version. The server execution data is no longer an undistinguishable set of records, but is organized based upon client information.

Figure 3:
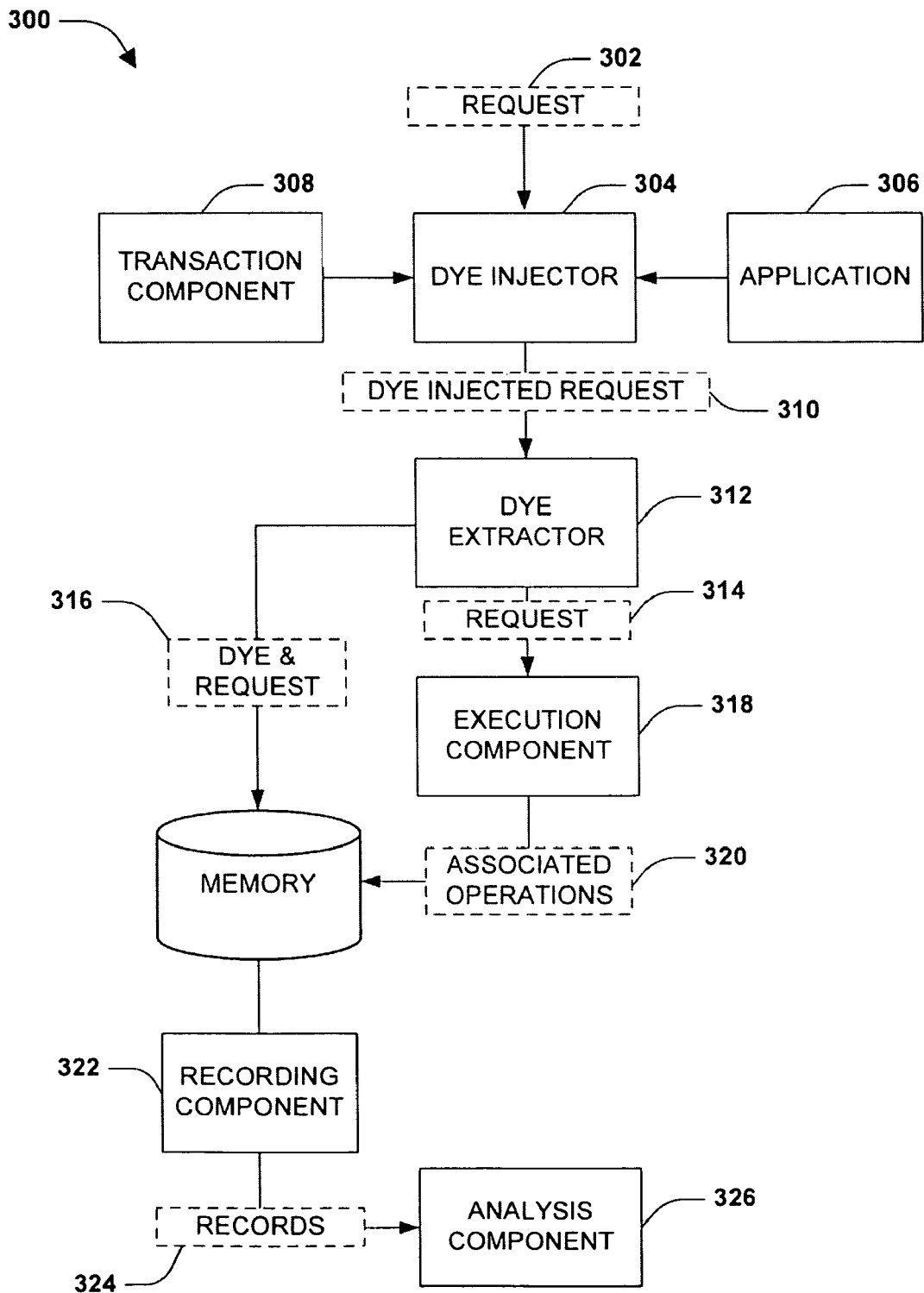
FIG. 3 is a component block diagram illustrating an exemplary system for tracking a request through dye injection and providing an analysis of associated server execution data.

FIG. 3 illustrates an example of a system 300 configured to track a request by dye injection and provide an analysis of associated server execution data. The system 300 comprises a dye injector 304 and a transaction component 308, which may be located on a client machine. The system 300 further comprises a dye extractor 312, an execution component 318, a recording component 322, and an analysis component 326, which may be located on a web server.

The dye injector 304 may be configured to identify a request 302; identify an application 306 originating the request 302; and/or identify a transaction comprising the request 302. The dye injection 304 may identify the request 302 and the application 306 by connecting to and monitoring a web request framework configured to create and send web requests. The dye injector 304 may receive information regarding the transaction from the transaction component 308. The transaction component 308 may be configured to define a transaction based upon a user input and/or a logical grouping of requests. The transaction component 308 may send the defined transaction to the dye injector 304.

The dye injector 304 is further configured to inject dye into the request 302, the dye comprising information regarding the application 306 and the transaction. The transaction component 308 may specify the transaction information to be injected. The application information to be injected may comprise information regarding the client machine running the application 306, the name of the application 306, the version of the application 306, and/or other appropriate information regarding the application 306.

One example of injecting dye into a request is where the dye injector 304 connects to a web request framework. The dye injector 304 may monitor the web request framework for HTTP requests. The dye injector 304 intercepts the HTTP requests using an HTTP proxy. The HTTP proxy allows the dye injector 304 to inject additional HTTP headers that identify an application and a transaction associated with the intercepted HTTP request.

A dye injected request 310 is created when the dye injector 304 injects the dye into the request 302. The dye injected request 310 may be sent to a web server that the request 302 was intended to reach. The web server comprises a web server process that hosts a web application. The web server process may be configured to execute functionality of the web application that the dye injected request 310 calls for. The dye extractor 312 is configured to intercept the dye injected request 310. The dye injected request 310 may be intercepted through a web server process pipeline. The dye extractor 312 extracts the dye from the dye injected request 310 and creates a dye and request record 316 that is recorded for the duration of executing the dye injected request 310 (e.g., a request lifetime). Once the dye is extracted, the dye extractor 312 may send request information 314 to the execution component 318.

The web server process executes the dye injected request 310 (e.g., the original request information from the request 302). During execution, the execution component 318 associates operations performed by the web server process with the recorded dye information (e.g., dye and request record 316). An operation may comprise server execution data, such as, a set of data inputs used to execute the request 302; a set of functionality executed to execute the request 302; and/or a request lifetime. The execution component 318 may associate operations by storing associated operations 320 with the dye and request record 316 in memory.

The recording component 322 is configured to create one or more records 324 relating to server execution data. A record may comprise information corresponding to a request; dye extract from the request; and/or one or more associated operations performed during execution of the request. The record may be stored in memory and/or in an execution recording for analysis. For example, the recording component 322 may create one or more records 324 corresponding to the request 302. The record 324 may comprise information from the dye and request record 316 and/or the associated operations 320 that correspond to the request 302.

The analysis component 326 is configured to present one or more records based upon user defined criterion. The user defined criterion may comprise a sort by application, a sort by client, a sort by transaction, sort by request lifetime, sort by transaction lifetime, sort by user identity, sort by calling function, sort by client OS, and/or a sort by request criteria. The user defined criterion may also comprise a sort by client machine property, wherein the client machine property may relate to a hardware property, a software environment property, and/or user data on the client machine. It may be appreciated that user defined criterion may comprise other information and/or criteria than listed. The analysis component 326 allows a user to separate server execution data based upon client information, such as, the application 306, the transaction, the request 302, and/or the client. This allows the user to organize server execution data into a useful analysis, even though the sever execution data may comprise data regarding multiple clients making multiple requests simultaneously from the same web server process.

Figure 4:
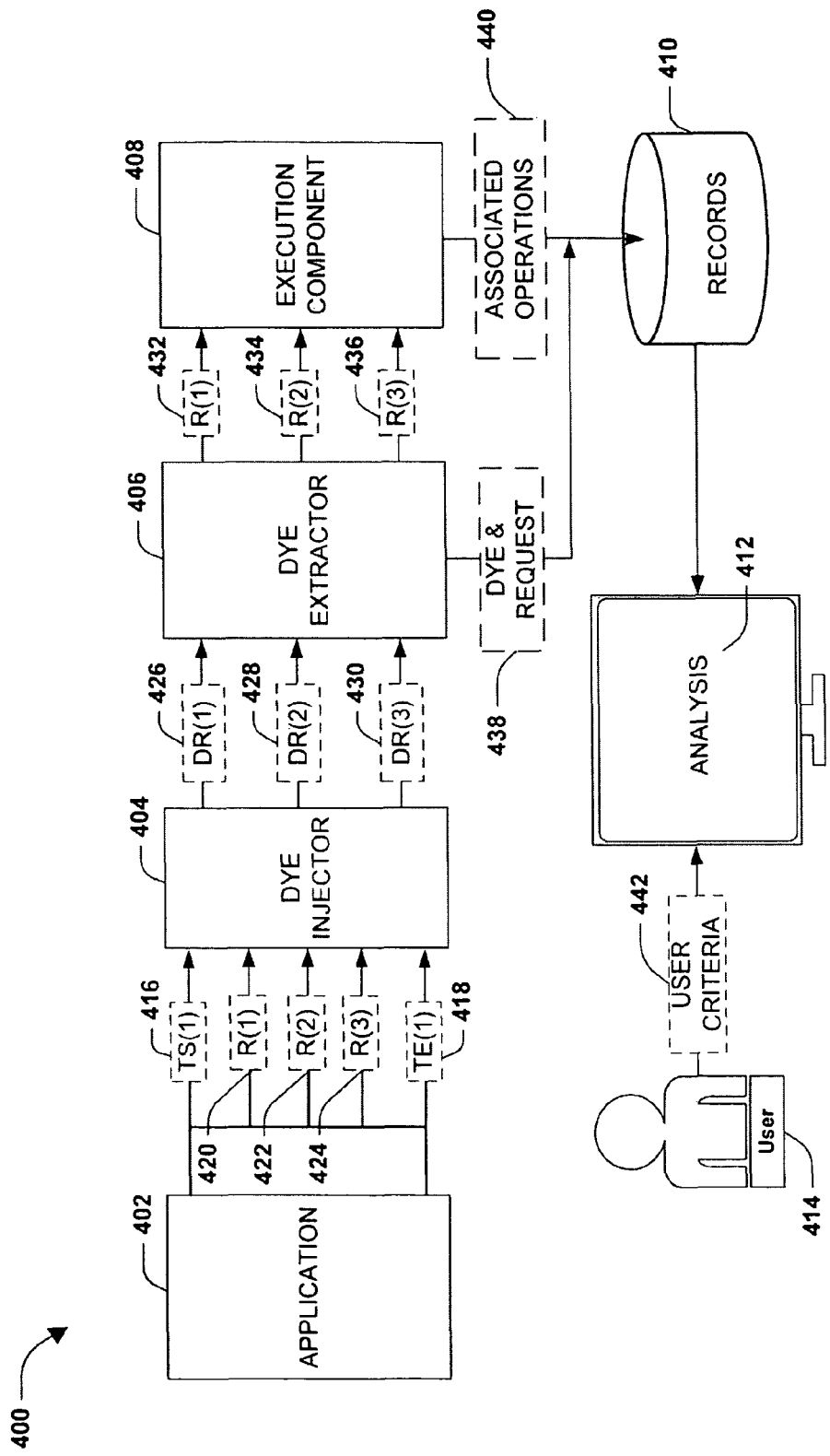
FIG. 4 is an illustration of an example of tracking a transaction through dye injection and providing an analysis of the transaction and associated server execution data.

FIG. 4 illustrates an example 400 of tracking a transaction by dye injection and providing an analysis of the transaction and associated server execution data. Example 400 comprises an application 402 and a dye injector 404, which may reside on a client machine. A transaction is defined by the client, comprising three requests from the application 402 to a web application located on a web server. The requests may comprise calls for functionality of the web application to be executed by a web server process hosting the web application.

The transaction is defined by a transaction start 416 and a transaction end 418. The transaction comprises a request (1) 420, a request (2) 422, and a request (3) 424. The application 402 sends the requests to the web server. The dye injector 404 intercepts the requests and the information defining the transaction. The dye injector 404 injects dye into request (1) 420 to produce a dye injected request (1) 426. The dye injector 404 injects dye into request (2) 422 to produce a dye injected request (2) 428. The dye injector 404 injects dye into request (3) 424 to produce a dye injected request (1) 430. The dye that is injected into the three requests comprises information regarding the application 402 and information regarding the transaction comprising the three requests.

The three dye injected requests are sent to the web server. The web server comprises a dye extractor 406, an execution component 408, a set of records 410, and an analysis component 412. The dye extractor 406 intercepts the three dye injected requests. The dye extractor 406 extracts the dye associated with the three dye injected requests. The dye may be extracted from an HTTP header associated with the request. A dye and request record 438, comprising the extracted dye and request information, may be stored in memory for the duration of time the request is executed (e.g., a request lifetime).

Once the dye is extracted, a request (1) information 432, a request (2) information 434, and a request (3) information 436 are received by the execution component 408. The request information may be used to identify and locate requests that have extracted dye associated with the request. During execution of a request, the execution component 408 associates (e.g., creates an associated operations set 440) operations performed by the web server process with the dye and request record 438 (e.g., the stored dye information) corresponding to the executed request. For example, the execution component 408 may connect to a web server processing pipeline to extract information regarding operations performed by the web server process in executing the request.

A record may be created comprising information from the dye and request record 438 and/or information from the associated operations set 440. In another implementation, the record may comprise information regarding the dye. The associated operations may not be comprised within the record, but are associated with the record during analysis of the record. It may be appreciated that dye information and execution operations may be associated after a record is created and that the record may comprise information about the dye, the request, and/or execution information. The record may comprise information of a request; dye information associated with the request; and/or associated operations. The associated operations may comprise data inputs used in executing the request, functionality executed in executing the request, and/or a request lifetime. One or more records may be stored within the set of records 410. The set of records 410 may be save in memory and/or a server execution log.

The analysis component 412 is configured to organize and present server execution data (e.g., one or more records within the set of records 410). A user 414 is able to input user criteria 442 into the analysis component 412. The user criteria 442 may comprise a sort by application, transaction, request, and/or other client information. The analysis component presents an analysis that provides meaningful server execution data that pertains to the transaction comprising the three requests 420, 422, and 424. This allows the user to filter out server execution data that does not pertain to the transaction, such as, execution data pertaining to other clients, other user transactions, etc. Separating server execution data by client information is important because the same web server process may host multiple web applications and process multiple requests, multiple clients making requests, and multiple applications making requests during recording of server execution data.

Figure 5:
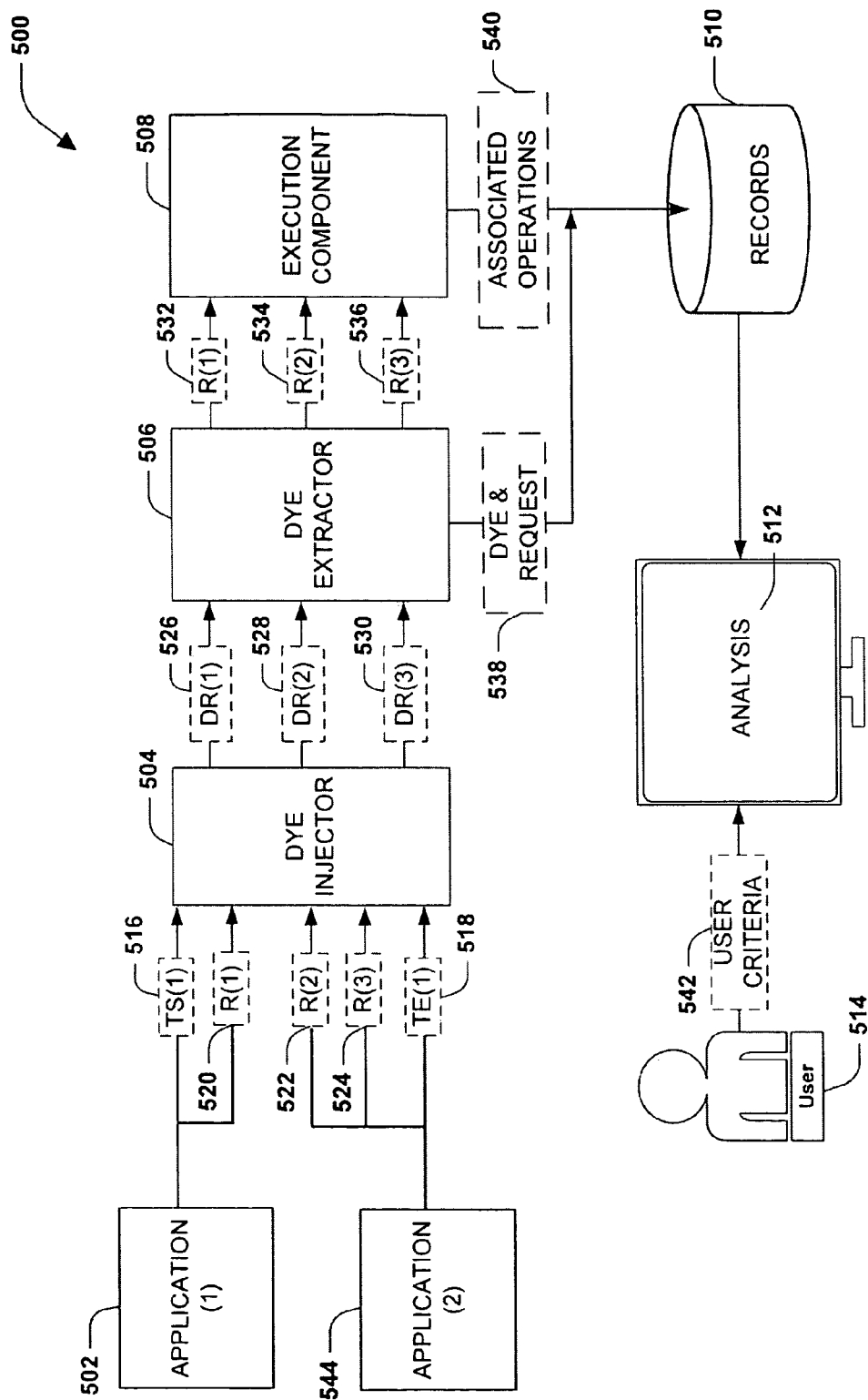
FIG. 5 is an illustration of an example of tracking a transaction from two applications and providing an analysis of the transaction and associated server execution data.

FIG. 5 illustrates an example 500 of tracking a transaction comprising two applications, and providing an analysis of the transaction and associated server execution data. Example 500 comprises an application (1) 502, an application (2) 544, and a dye injector 504, which may reside on a client machine. A transaction is defined by the client, comprising a request (1) 520 from the application (1) 502, a request (2) 522 from the application (2) 544, and a request (3) 524 from the application (2) 544. The transaction is defined by at transaction start 516 and a transaction end 518.

It may be appreciated that a client machine may comprise multiple transactions that simultaneously exist on the client machine. A request may be associated with a corresponding existing transaction. For example, multiple transactions may be associated with one or more users that may be logged into a client machine. One or more requests, made by a user through one or more applications, may be associated with the appropriate transaction, wherein multiple transactions may exist on the client machine. It may be further appreciated that a transaction may be defined by an application, a user, and/or an action (e.g., a user starting a test).

The three requests are sent to a web server. The dye injector 504 intercepts the three requests and the transaction information. The dye injector 504 creates a dye injected request (1) 526 by injecting dye into the request (1) 520, the injected dye comprising information about the application (1) 502 and information of the transaction. The dye injector 504 creates a dye injected request (2) 528 by injecting dye into the request (2) 522, the injected dye comprising information about the application (2) 544 and information of the transaction. The dye injector 504 creates a dye injected request (3) 530 by injecting dye into request (3) 524, the injected dye comprising information about the application (3) 544 and information of the transaction. Once the dye is injected, the dye injected requests are sent to the web server.

The web server may comprise a dye extractor 506, an execution component 508, a set of records 510, and an analysis component 512. The dye extractor 506 intercepts the dye injected requests. The dye extractor 506 extracts the dye associated from the dye injected requests. A dye and request record 538, comprising the extracted dye and request information, may be stored in memory for the duration of time the request is executed (e.g., a request lifetime). Once the dye is extracted, a request (1) information 532, a request (2) information 534, and a request (3) information 536 are received by the execution component 508. The request information may be used to identify and locate requests that have extracted dye associated with the request.

During execution of a request, the execution component 508 associates (e.g., creates an associated operations set 540) operations performed by the web server process with the dye and request record 538. A record may be created comprising information from the dye and request record 538 and information from the associated operations set 540. One or more records may be stored within the set of records 510. The analysis component 512 allows a user 514 to specify user criteria 542. The analysis component 512 organizes and presents one or more records from the set of records 510 based upon the user criteria 542.

For example, the user 514 may specify a user criteria 542 instructing the analysis component 512 to present records pertaining to the application (2) 544. The analysis component 512 presents tagged record information of the request (2) 522 and the request (3) 524 because the two requests originated from the application (2) 544. The tagged record information may comprise server execution data, the transaction comprising the two requests, and/or other client information. This allows the user to view server execution data corresponding to specified client information, such as, an application, a request, and/or a transaction.

Figure 6:
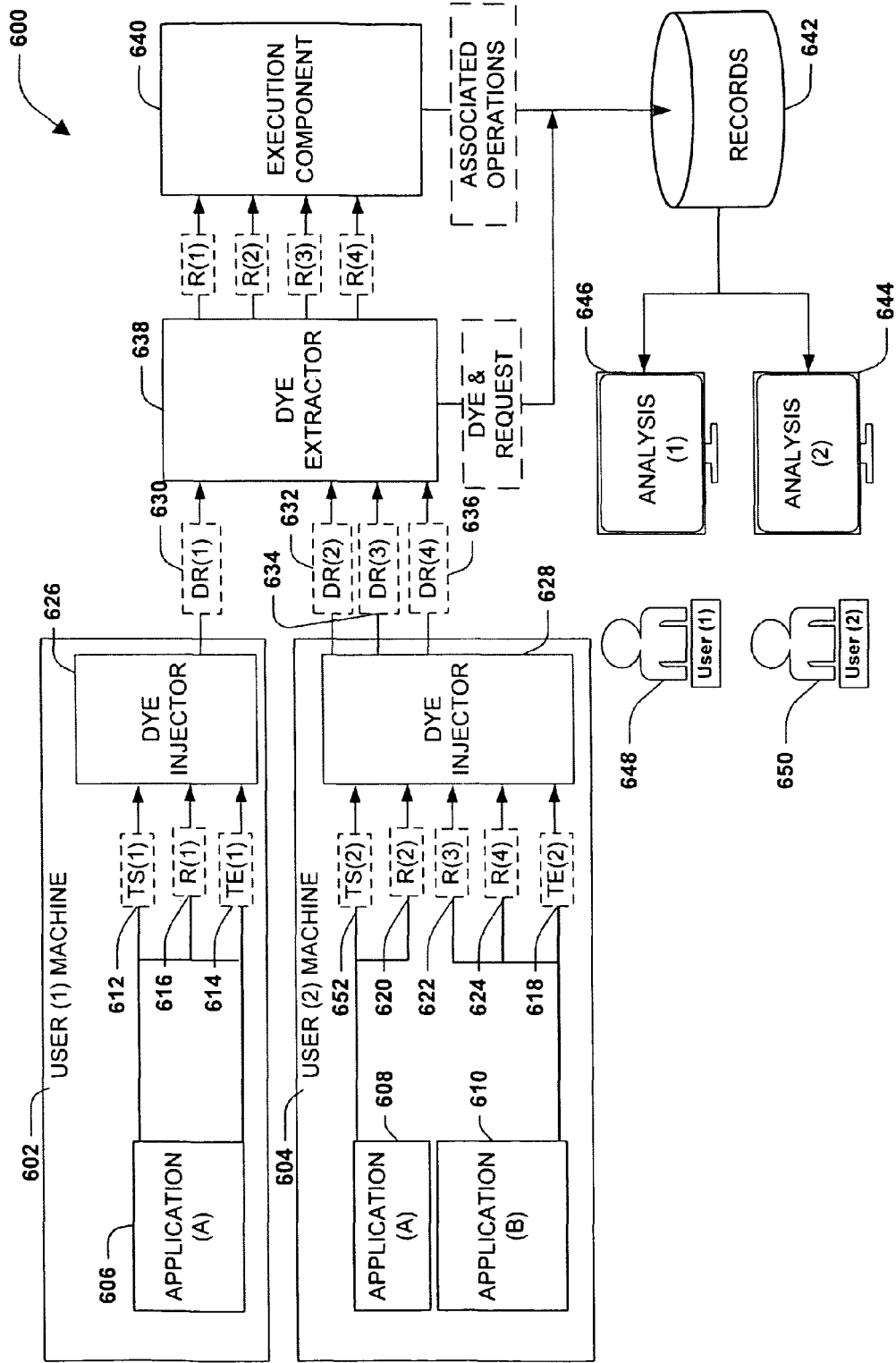
FIG. 6 is an illustration of an example of tracking two transactions and providing an analysis of the transactions and associated server execution data.

FIG. 6 illustrates an example 600 of tracking two transactions and providing an analysis of the transactions and associated server execution data. Example 600 comprises a user (1) machine 602 and a user (2) machine 604. The user (1) machine 602 comprises an application (A) 606 and a dye injector 626. The user (2) machine 604 comprise an application (A) 608 (e.g., a similar runtime as application (A) 606 on User (1) machine 602), an application (B) 610, and a dye injector 628.

A transaction (1) may be defined by the client as a transaction start 612 and a transaction end 614. The transaction (1) comprises a request (1) 616. When the application (A) 606 makes the request (1) 616, the dye injector 626 intercepts the request (1) 616. The dye injector 626 injects dye comprising information regarding application (A) 606 and transaction (1). A dye injected request (1) 630 is created and sent to a web server comprising a server process hosting a web application (e.g., the request (1) 616 is meant to invoke functionality of the web application).

A transaction (2) may be defined by the client as a transaction start (2) 652 and a transaction end (2) 618. Transaction (2) comprises a request (2) 620 from the application (A) 608, a request (3) 622 from application (B) 610, and a request (4) 624 from application (B) 610. Once the dye injector 628 intercepts one of the requests, the dye injector 628 creates a corresponding dye injected request. For example, the dye injector 628 creates a dye injected request (2) 632 comprising the request (2) 620, information regarding the application (A) 608, and information regarding the transaction (2). The dye injector 628 creates a dye injected request (3) 634 comprising the request (3) 622, information regarding the application (B) 610, and information regarding the transaction (2). The dye injector 628 creates a dye injected request (4) 636 comprising the request (4) 624, information regarding the application (B)

610, and information regarding the transaction (2). One or more dye injected requests are sent to the web server.

It may be appreciated that a transaction may span multiple client machines. That is, a transaction may comprise one or more requests from a client machine (A) and one or more requests from a client machine (B).

At the web server, a dye extractor 638 intercepts the dye injected requests (e.g., 630, 632, 634, and 635). When the dye extractor 638 intercepts one of the dye injected requests, the dye comprised within the intercepted request is extracted. The extracted dye may be stored as a dye and request record in memory. An execution component 640 receives the request information after the dye is extract. During execution of the request, the execution component 640 associates operations performed by the web server process with the recorded dye information (e.g., the dye and request record). A record is created comprising the request information, the dye, the associated operations, and a lifetime of the request. One or more records may be stored as a set of records 642 in memory and/or an execution log.

A user (1) 648 may create, with an analysis component (1) 646, a presentation comprising the server execution data related to application (A) 606, request (1) 616, user (1) machine 602, and/or transaction (1). A user (2) 650 may create, with an analysis component (2) 644, a presentation comprising the server execution data related to application (A) 608, application (B) 610, request (2) 620, request (3) 622, request (4) 624, user (2) machine 604, and/or transaction (2). An analysis may be presented based upon one or more records from the set of records 642 that correspond to specified client filter (e.g., user defined criterion, sort by client application, etc.).

Figure 7:
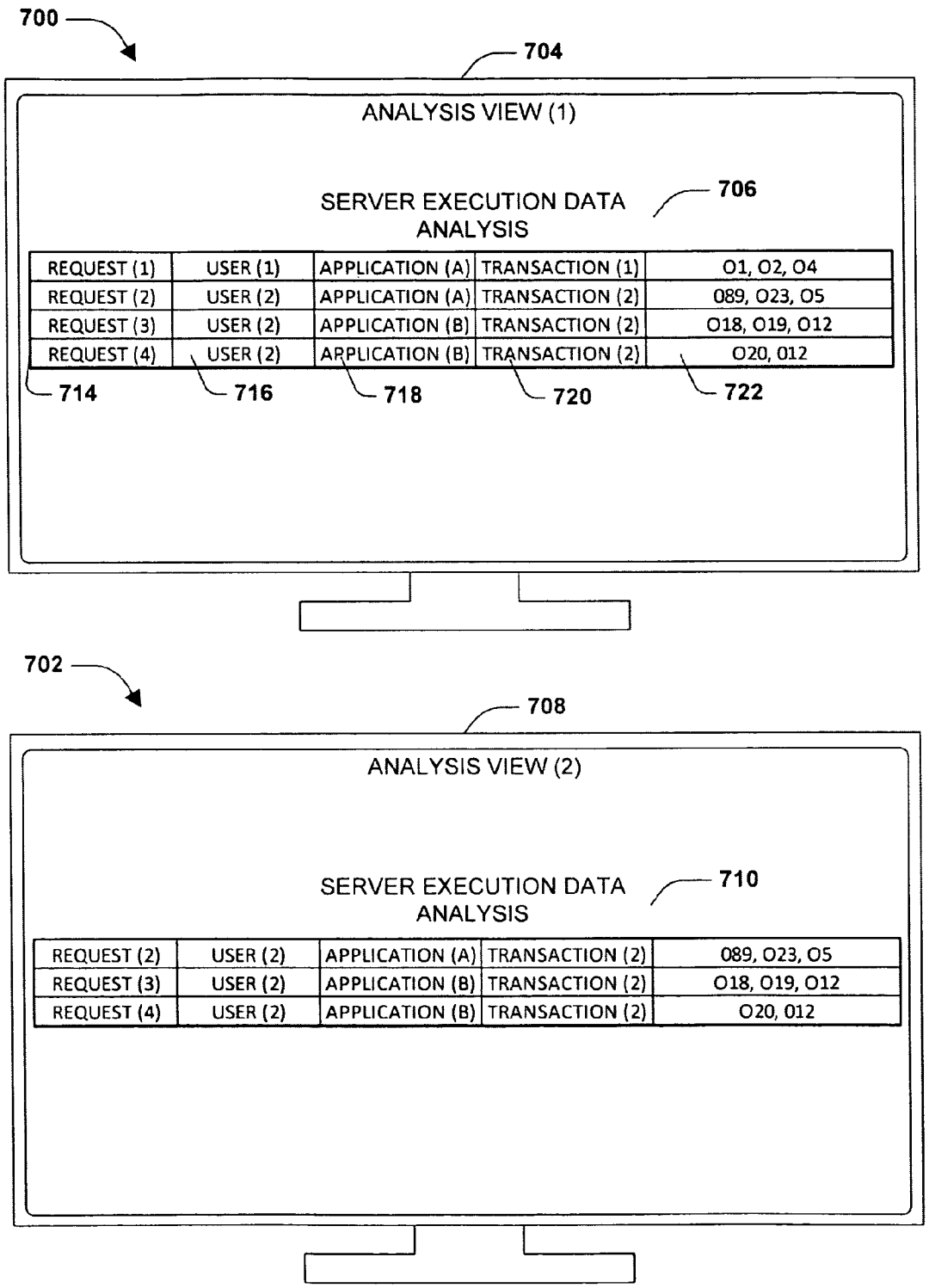
FIG. 7 is an illustration of an example of a presentation of server execution data.

FIG. 7 illustrates an example 700 and an example 702 of a presentation of server execution data. Server execution data may comprise information regarding a request, a transaction comprising the request, an application that originated the request, a client that made the request, and/or one or more associated operations. The associated operations may comprise the data inputs used in executing a request, functionality executed in executing the request, and/or a request lifetime. The server execution data may be stored in the form of one or more records.

An analysis view (1) 704 presents a data analysis chart 706 of server execution data. The data analysis chart 706 comprises 4 rows, wherein a row corresponds to a record of information for a request executed by a web server process. A row may comprise information from multiple records. The record of information may comprise server execution data and/or client information pertaining to the request. For example, a request (4) row 714 is presented within the data analysis chart 706. The request (4) row 714 presents information regarding the client that sent request (4) (e.g., a user (2) cell 716); the application that made request (4) (e.g., an application (B) cell 718); the transaction that request (4) is within (e.g., a transaction (2) cell 720); and the operations performed during execution of request (4) (e.g., an operations list cell 722). It may be appreciated that a data analysis may comprise other information than listed.

An analysis view (2) 708 presents a data analysis chart 710 of server execution data corresponding to a transaction (2). The data analysis chart 710 provides client information and server execution data corresponding to requests executed for the purpose of completing transaction (2). For example, the data analysis chart 710 is filtered by a transaction (2) criterion. Because server execution data may comprise a large number of requests, the ability to filter the server execution data by a criterion (e.g., client, application, transaction, etc.) provides a user with an organized and useful analysis of the server execution data. The user is able to view what server functionality was performed in completing transaction (2) and exclude other server execution data. This may provide useful debug and diagnostic information because of the organized format.

A user may view the server execution data through sorting by client machine, the number of requests from a specified user, what applications made the requests, and/or what transactions comprised the requests. A user analysis is not limited to server execution data, but may comprise other useful information (e.g., an operating system of a client machine making the request, a call stack of a thread making the request, and/or other contextual information) that further describes requests made by a client. Another view may provide data sorted by a request, the client making the request, and what transaction comprised the request. The different views of server execution data allow a user to separate server activity (e.g., web server process executing requests) by client information.

Figure 8:
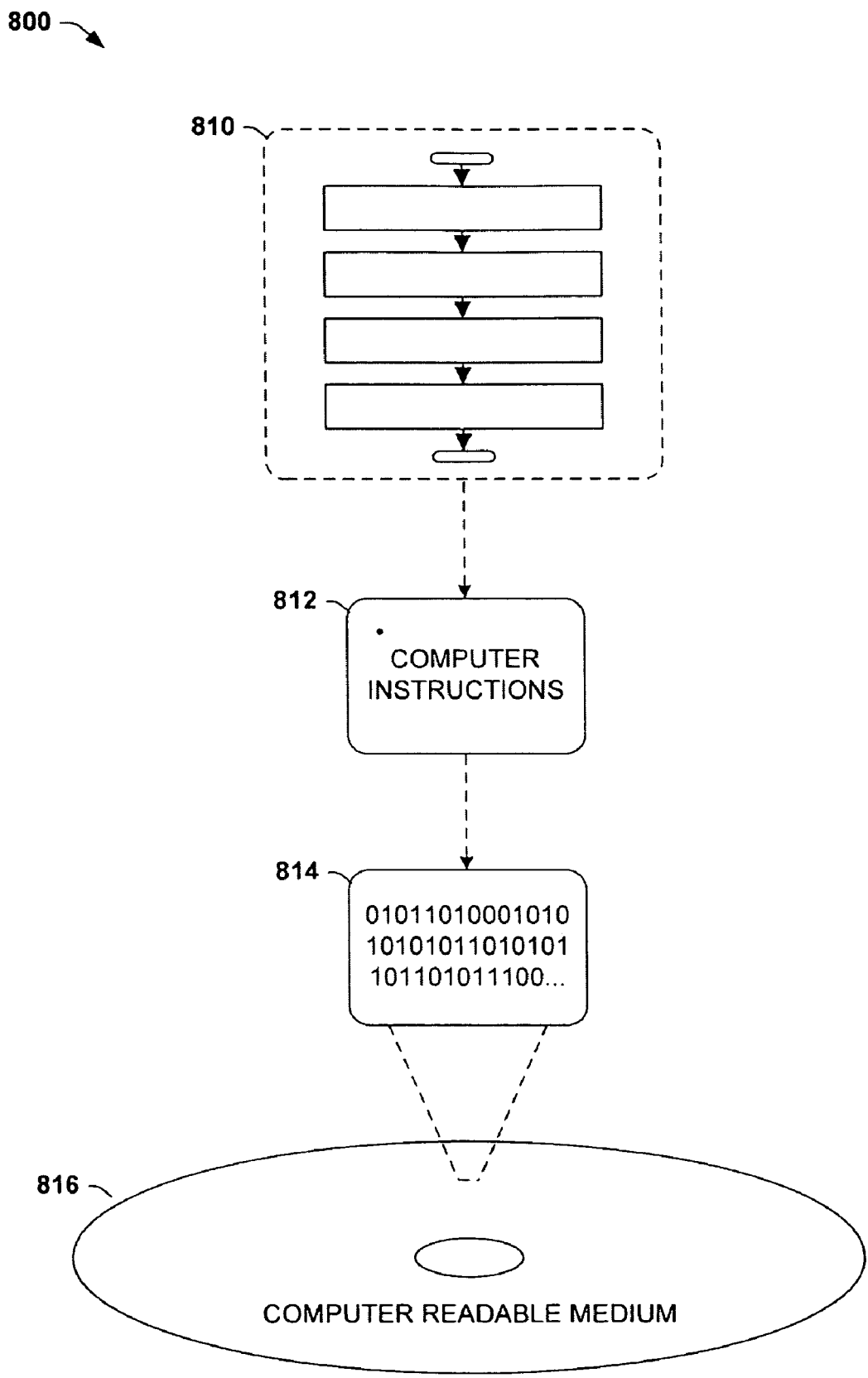
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 810. This computer-readable data 810 in turn comprises a set of computer instructions 812 configured to operate according to one or more of the principles set forth herein. In one such embodiment 800, the processor-executable instructions 814 may be configured to perform a method, such as the exemplary method 100 of FIG. 1, for example. In another such embodiment, the processor-executable instructions 814 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media.

Of course, those skilled in the art will recognize many modifications may be made to this configuration without departing from the scope or spirit of the claimed subject matter.

Figure 9:
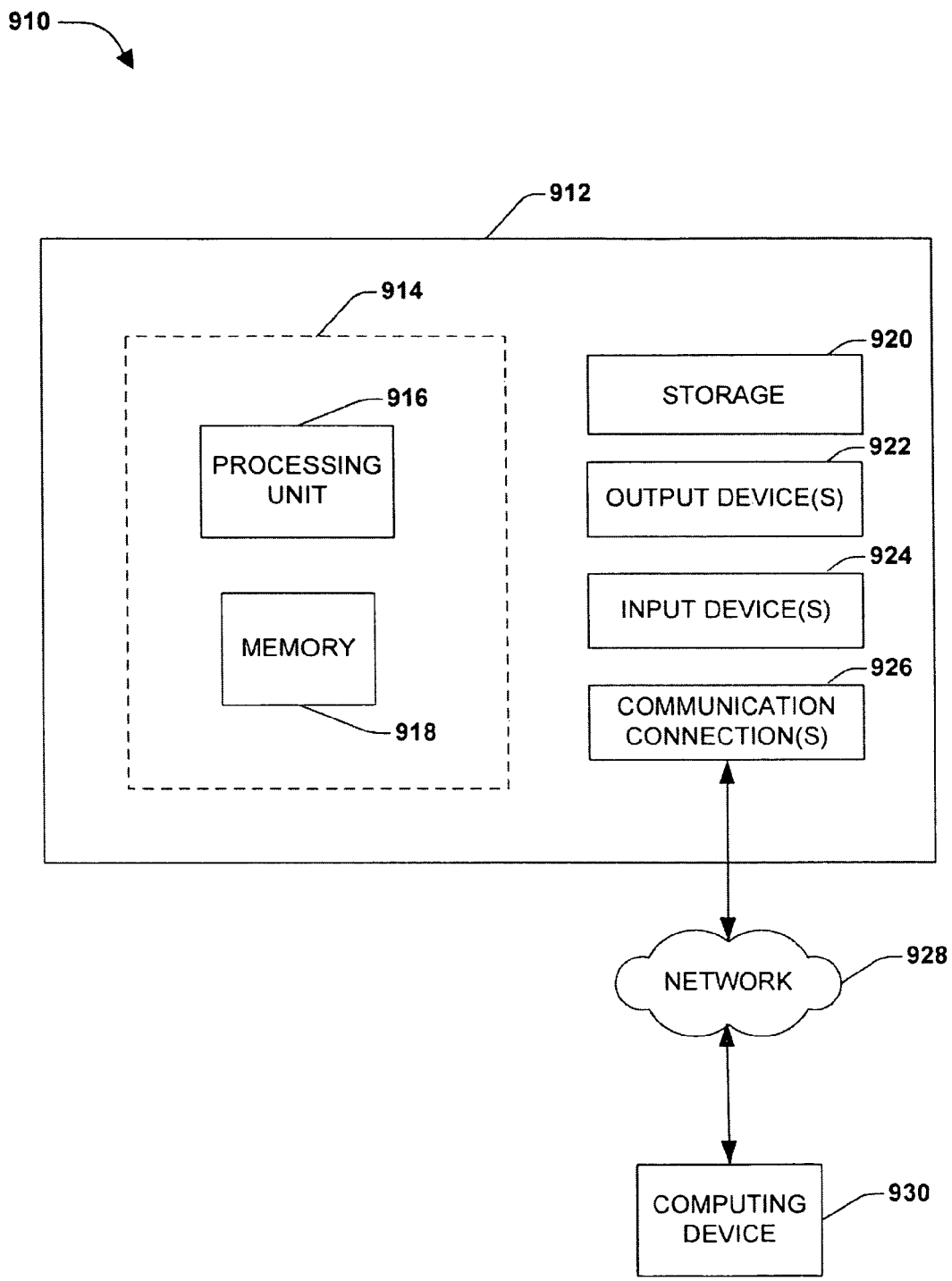
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for creating a dye injected request, comprising:
    injecting, on a client machine, dye into a request created by the client machine, the dye comprising information regarding an application from which the request originated and a transaction within which the request is comprised, the application executing on the client machine, the request associated with a web service hosted by a server machine and consumed by the client machine, at least some of the injecting performed at least in part with a processor; and
    sending the dye injected request to the server machine different than the client machine.

2. The method of claim 1, the injecting dye comprising:
    connecting with an extensible protocol to a request framework.

3. The method of claim 1, comprising:
    connecting an http proxy to a web request framework; and
    inserting with the http proxy an http header, identifying the application, into the web request framework.

4. The method of claim 1, comprising:
    connecting an http proxy to a web request framework; and
    inserting with the http proxy an http header, identifying the transaction, into the web request framework.

5. The method of claim 1, comprising:
    defining the transaction based upon a user designation of a logical activity comprising one or more requests originating from two or more applications executing on the client machine.

6. The method of claim 1, the dye comprising contextual information comprising at least one of the following:
    an operating system of the client machine; and
    information describing one or more applications installed on the client machine.

7. A method for tracking one or more dye injected requests, comprising:
    receiving a dye injected request from a client machine at a server machine different than the client machine, the dye injected request created by the client machine and injected with dye by the client machine, the dye injected request associated with a web service hosted by the server machine and consumed by the client machine;
    extracting the dye from the request, the dye comprising information regarding an application executing on the client machine from which the request originated and a transaction within which the request is comprised; and
    executing the request and associating with the dye one or more operations, performed during the execution of the request, at least some of one or more of the receiving, extracting, and executing performed at least in part with a processor.

8. The method of claim 7, the extracting comprising at least one of:
    extracting one or more http headers associated with information regarding the application from which the request originated; and
    extracting one or more http headers associated with information regarding the transaction within which the request is comprised.

9. The method of claim 8, the extracting comprising:
    storing a request lifetime with the extracted http headers, the request lifetime comprising a begin event and an end event defining the duration of executing the request.

10. The method of claim 9, the associating comprising:
    connecting to an execution pipeline during the request lifetime;
    extracting operation information regarding one or more operations performed during the execution of the request; and
    storing the extracted operation information with the stored http headers.

11. The method of claim 7, comprising:
    creating one or more records comprising at least one of:
        the request;
        the extracted dye; and
        the associated operations performed during the execution of the request.

12. The method of claim 11, the associated operations comprising at least one of:
    a set of data inputs used to execute the request;
    a set of functionality executed to execute the request; and
    a request lifetime based upon the duration of executing the request.

13. The method of claim 11, comprising:
    presenting one or more records based upon a user defined criterion.

14. The method of claim 13, the user defined criterion comprising at least one of the following:
    sort by application; and
    sort by transaction.

15. A system for tracking a request, comprising:
    a dye injector configured to:
        inject, on a client machine, dye into a request created by the client machine, the dye comprising information regarding an application executing on the client machine from which the request originated, and information regarding a transaction within which the request is comprised, the request associated with a web service hosted by a server machine and consumed by the client machine; and send the dye injected request to the server machine different than the client machine.

16. The system of claim 15, comprising:

a transaction component configured to define a transaction comprising one or more requests originating from two or more applications on the client machine.

17. The system of claim 15, comprising:

a dye extractor configured to at least one of:
  receive the dye injected request;
  extract the dye from the request; and
  record the dye, extracted from the request, for a duration of executing the request; and
an execution component configured to:
  associate one or more operations, performed during execution of the request, with the dye.

18. The system of claim 17, comprising:

a recording component configured to create a record comprising at least one of:
  the request;
  the dye from the request; and
  the one or more associated operations performed during the execution of the request.

19. The system of claim 18, comprising:

an analysis component configured to:
  present one or more records based upon user defined criterion.

20. The system of claim 19, the user defined criterion comprising at least one of the following:
  sort by application; and
  sort by transaction.

* * * * *